United States Patent [19]
Cronenwett et al.

[11] Patent Number: 4,896,454
[45] Date of Patent: Jan. 30, 1990

[54] APPARATUS AND METHOD FOR TREATING TREES

[76] Inventors: Duane Cronenwett, 748 Hummingbird Way, North Palm Beach, Fla. 33408; Robert W. Gottfried, 748 Hi Mount Rd., Palm Beach, Fla. 33480

[21] Appl. No.: 199,791
[22] Filed: May 27, 1988
[51] Int. Cl.$^4$ .............................................. A01G 7/06
[52] U.S. Cl. ..................................... 47/57.5; 248/231; 248/219.4
[58] Field of Search ....................... 47/59, 57.5, 50, 53; 248/231, 219.4

[56] References Cited

U.S. PATENT DOCUMENTS

| | | | |
|---|---|---|---|
| 1,113,781 | 10/1914 | Griffin | 248/231 |
| 1,718,195 | 6/1929 | Rankin | 47/57.5 |
| 2,044,063 | 6/1936 | Dahlberg | 47/57.5 |
| 2,930,638 | 3/1960 | Morrissey | 248/231 |
| 2,959,388 | 11/1960 | Fogle | 248/231 |
| 2,973,758 | 3/1961 | Murrish | 604/413 |
| 3,295,254 | 1/1967 | Schoonman | 47/57.5 |
| 3,864,874 | 2/1975 | Norris et al. | 47/57.5 |
| 4,121,525 | 10/1978 | Courtis | 47/59 X |
| 4,325,529 | 4/1982 | Seebinger | 248/219.4 X |
| 4,698,935 | 10/1987 | Cronenwett et al. | 47/57.5 |

FOREIGN PATENT DOCUMENTS

| | | | |
|---|---|---|---|
| 2835430 | 2/1980 | Fed. Rep. of Germany | 47/57.5 |
| 137434 | 6/1880 | France | 47/57.5 |
| 66757 | 9/1957 | France | 47/57.5 |

Primary Examiner—Robert A. Hafer
Assistant Examiner—Kevin G. Rooney
Attorney, Agent, or Firm—Leonard Bloom

[57] ABSTRACT

An apparatus and method for treating trees (especially trees of relatively small size or diameter) with a liquid. At least one hole is formed in the trunk of a tree extending into the cambium layer thereof. A bracket is secured to the tree. An upstanding inclined hollow tube, having an inner open end and an outer end, is provided. A resilient bushing is positioned in the inner end of the tube and extends therefrom. A self-sealing bushing is positioned in the outer end of the tube, thereby sealing the tube. The resilient bushing has an aperture formed therein which is substantially identical in size to the hole in the tree. The resilient bushing in the tube is pressed against the trunk of the tree with the aperture thereof positioned substantially coincident with the hole in the tree, thereby providing for liquid communication between the tube and the hole. This pressing further deforms the resilient bushing, thereby forming a substantially liquid-tight seal therebetween. The tube is then secured to the bracket by suitable means with the resilient bushing being deformed. Finally, a needle is inserted through the self-sealing bushing and into the tube. Liquid is injected into the tube from the needle, so that liquid is maintained in the tube permitting the tree to "feed" as desired. The needle is then withdrawn from the tube, such that the bushing reseals itself, precluding the injected liquid from escaping from the tube.

21 Claims, 4 Drawing Sheets

APPARATUS AND METHOD FOR TREATING TREES

FIELD OF THE INVENTION

The present invention relates to an apparatus and method for treating trees with medication or nutrients and, more particularly, to an improved apparatus and method for treating trees with a liquid.

BACKGROUND OF THE INVENTION

Like humans and other animals, plant life (such as trees) are susceptible to becoming afflicted with various diseases and afflictions. Sometimes trees may be saved with proper treatment by the use of various nutrients. Other times trees are treated in the first instance by innoculation with various antibiotics.

At times, these nutrients and antibiotics are delivered to the tree by application to the soil where the roots are located. However, it is often necessary to innoculate the tree by applying the antibiotics and/or nutrients directly to the cambium layer of the tree.

In the prior art of which I am aware, various devices and instruments have been employed for injecting a liquid into a tree for the purpose of destroying insects and diseases which infest the tree and for providing nourishment to stimulate growth. Generally, an opening is bored into the trunk of the tree, and the liquid is injected into the tree under pressure by means of a suitable coupling, such as the needle of a hypodermic needle. Examples of such devices are U.S. Pat. Nos. 1,756,453; 2,116,591; 3,864,874; 4,011,685; 4,342,176 and 4.698,935.

In the aforementioned '935 patent, a metal cartridge is driven into a downwardly-inclined bore in the trunk of a tree, and a hypodermic needle is inserted through a mass of sealable material carried by the rearward end portion of the cartridge and accessible externally thereof. Preferably, the sealable material comprises silicone which is room temperature vulcanizable ("RTV") and may be color coded to readily indicate to the operator the successive stages in the innoculation or other treatment of the tree. The needle is closely guided through the RTV by means of a restricted diameter bore and counterbore in the cartridge, and the liquid is injected into the cartridge and flows out the forward open end thereof. In a preferred embodiment, the cartridge comprises a rifle cartridge from which the primer has been removed. The cartridge is rugged and reliable, inexpensive, and may be driven into the tree trunk by a hammering action.

Generally speaking, each of these apparatus and methods require the formation of a relatively deep bore in the trunk of a tree into which a capsule or reservoir is disposed. Liquid is then disposed into this capsule for treating the tree. Unfortunately, use of such an arrangement is not possible where trees having a small size or diameter is involved. In addition to not having a trunk which is thick enough to receive the apparatuses therein, in such trees, forming of a bore therein which possesses a size large enough to receive the apparatus would be detrimental to the health thereof and may even possibly result in the death of the tree. None of the apparatuses or methods of which I am aware, wherein liquid is injected into the trunk, provide an apparatus or method wherein a reservoir is provided that does not have to be supported within the bore.

SUMMARY OF THE INVENTION

Accordingly, it is an object of the present invention to provide an apparatus which may be utilized to treat a tree with a liquid, wherein the apparatus is not disposed within nor supported in a bore formed within the trunk of the tree.

It is a further object of the present invention to provide such an apparatus which is self-sealing and constitutes a reservoir for the liquid, allowing the tree to feed as desired.

It is a still further object of the present invention to provide a simple, inexpensive means to support the apparatus against the trunk of the tree so that there is a watertight seal therebetween.

In another aspect of the present invention, it is an object of the present invention to provide a method for treating a tree with a liquid, wherein a hole is formed in the trunk into the cambium layer thereof only for feeding purposes and not for supporting a liquid reservoir.

It is a yet still further object of the present invention to provide a method for supporting an apparatus against the trunk of the tree, wherein the apparatus feeds the liquid into the tree.

In accordance with the teachings of the present invention, there is provided a method for treating a tree with a liquid, wherein the tree has a cambium layer. The method includes forming a hole in the trunk, the hole extending into the cambium layer of the tree.

A bracket is fastened about the trunk of the tree; and an upstanding inclined tube, including an inner open end and an outer end, is supported on the bracket. A resilient bushing is positioned in the inner end of the tube and extends therefrom. The bushing has an aperture formed therein, and the aperture has a size which is substantially identical to the hole. A self-sealing bushing is positioned in the outer end of the tube, whereby the outer end is sealed. The resilient bushing (carried by the inner end of the tube) is pressed against the trunk of the tree, such that the aperture formed in the resilient bushing is substantially coincident with the hole formed in the trunk. In this fashion, liquid communication is provided between the tube and the hole in the trunk, and the resilient bushing deforms forming a substantially liquid-tight seal between the resilient bushing and the trunk of the tree. A liquid is injected into the inclined tube through the sealed end thereof. In this manner, the liquid passes from the tube through the aperture formed in the resilient bushing and into the hole in the trunk, wherein the liquid is absorbed by the tree, thereby treating the tree.

Preferably, a hypodermic needle is provided having liquid therein. The needle is inserted through the self-sealing bushing and into the tube. The liquid is injected from the needle through the tube, the aperture formed in the resilient bushing, and into the hole formed in the trunk. Finally, the needle is withdrawn from the tube, such that the self-sealing bushing reseals itself, substantially precluding the injected liquid from escaping from the tube.

Preferably, the hole in the trunk is substantially ⅛ inch in diameter, extends substantially 1/16 inch into the trunk, and terminates in the cambium layer of the tree.

The present invention is especially useful with trees having a trunk of relatively small diameter but is not limited by the diameter of the trunk or the size of the tree.

In another aspect of the present invention, there is disclosed an apparatus for treating a tree with a liquid, wherein the tree has a cambium layer, said trunk further having at least one hole formed therein, extending into the cambium layer. The apparatus includes a bracket which is secured to the tree. An upstanding inclined hollow tube, including an inner end and an outer end, is provided. A resilient bushing is positioned in the inner end and extends therefrom. The bushing has an aperture formed therein of a size which is substantially identical to the hole. A self-sealing bushing is positioned in the outer end of the tube, thereby sealing the tube. A needle may be passed through this self-sealing bushing for the purpose of injecting the liquid into the tube; and the needle may be withdrawn from the self-sealing bushing, wherein the bushing reseals itself to preclude liquid from escaping from the tube through the outer end thereof. Finally, a means is provided for securing the tube (having the resilient bushing and the self-sealing bushings positioned therein) to the bracket. In this manner, the resilient bushing is pressed against the trunk of the tree such that the aperture in the resilient bushing is positioned substantially coincident with the hole in the trunk. This arrangement provides for liquid communication between the tube and the hole and also for deformation of the resilient bushing against the trunk, whereby a liquid-tight seal is provided therebetween.

Preferably, the means for securing the tube to the bracket includes a pair of spaced apart and substantially parallel screws carried by the bracket. A circular plate carries the upstanding inclined tube, such that the tube extends therethrough. The plate has a pair of apertures formed therein, complementary to the screws, so as to receive the screws therein. A nut is received on and engages a respective screw for removably securing the plate to the bracket.

Viewed in another aspect, the present invention constitutes an improved apparatus for treating a tree, wherein the tree includes a trunk having a diameter, and wherein a hole is drilled in the trunk of the tree. The apparatus includes a tube forming a reservoir of liquid to be administered to the tree. A resilient member is carried by the tube and is adapted to be pressed against the trunk of the tree. The resilient member has an aperture formed therein to communicate the reservoir in the tube with the hole formed in the tree trunk. Means are provided for mounting the tube on the tree trunk with sufficient compression such that the resilient member is deformed about the hole in the tree trunk, thereby substantially forming a seal, and such that the tree may feed on the liquid in the reservoir in the tube.

Preferably, the tube is inclined upwardly, such that the liquid is gravity fed from the tube into the hole in the trunk of the tree. The hole in the tree trunk extends into the cambium layer of the tree trunk. The tube has an open inner end substantially adjacent to the tree, and the resilient member comprises a resilient bushing carried by the open inner end of the tube and extending therefrom to engage the tree trunk. The tube has an open outer end, and a self-sealing bushing is carried by the open outer end of the tube. With this arrangement, a hypodermic needle may be inserted through the self-sealing bushing to inject liquid into the tube; and when the needle is removed, the self-sealing bushing reseals itself.

In a preferred embodiment, the means for mounting the tube includes a bracket adjacent to the tree trunk, and means are provided for securing the bracket to the tree trunk. This means includes a webbing connected to respective ends of the bracket and wrapped around the circumference of the tree trunk. A plate is carried by the tube; the tube extends beyond the plate, and means are provided for securing the plate to the bracket. Means are further provided for adjusting the tension of the webbing about the circumference of the tree trunk, thereby adjusting the degree to which the resilient member carried by the tube is deformed against the tree trunk.

These and other objects of the present invention will become apparent from a reading of the following specification taken in conjunction with the enclosed drawings.

DESCRIPTION OF PREFERRED EMBODIMENTS

With reference to FIGS. 1–4, the apparatus 10 of the present invention includes an upstanding inclined hollow tube 11, a circular plate 12 which carries the upstanding tube 11 extending therethrough, a bracket 13 and a means 14 for securing the bracket body to the tree 1.

This apparatus 10 is especially useful for treating trees 1 having a trunk 2 of a relatively small size or diameter. As shown more clearly in FIGS. 2 and 3, trunk 2 of the tree has an inner bark 3, an outer bark 4, and a cambium layer 5 therebetween. At least one hole 6 is formed in the trunk 2 of the tree 1. This hole 6 is preferably ⅛ inch in diameter and 1/16 inch deep. In any event, the hole 6 must extend into the cambium layer 5 of the tree 1, so that the tree 1 may absorb and "feed" on a liquid 7 disposed in the tube 11 of the apparatus 10.

Figure 1:
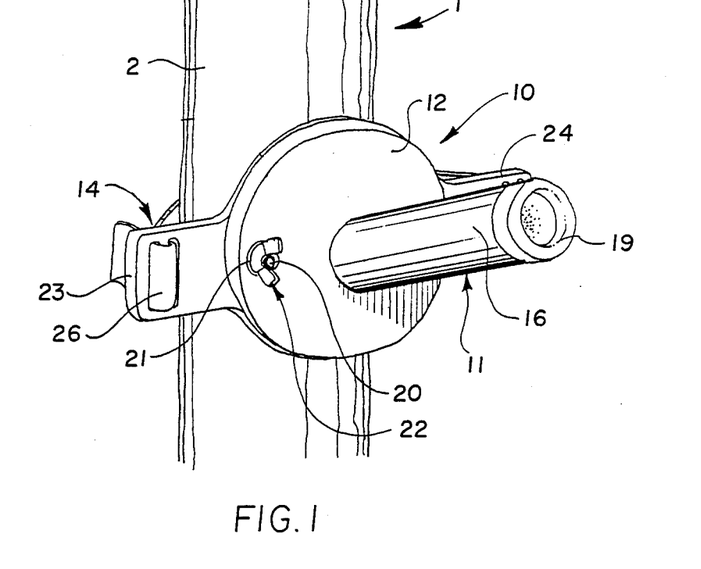
FIG. 1 is a perspective view of the apparatus of the present invention, showing the apparatus pressed against the trunk of the tree.
Figure 2:
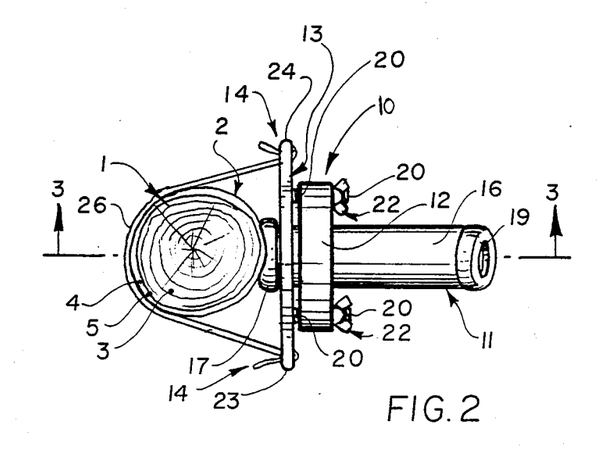
FIG. 2 is a top plan view of the apparatus of FIG. 1, with the trunk of the tree being shown in section.
Figure 3:
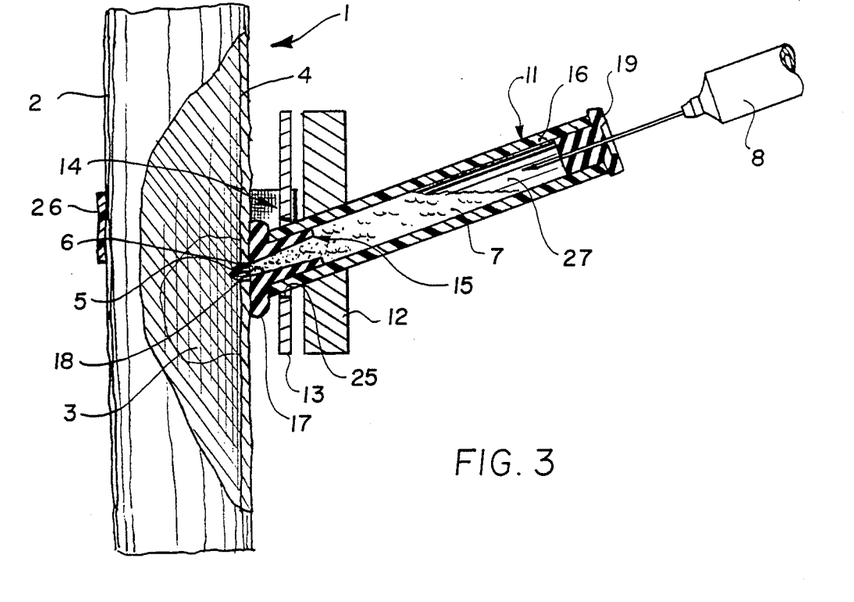
FIG. 3 is a cross-section view, taken along the lines 3—3 of FIG. 2, and further illustrating the needle being inserted into the tube.

The hollow tube 11 includes an inner end 15 and an outer end 16. A resilient bushing 17 is positioned in the inner end 15 and extends therefrom. This resilient bushing 17, which is preferably formed of silicone material, has an aperture 18 formed therein. This aperture 18 has a size that is substantially identical to the hole 6. Preferably, this size is ⅛ inch.

A self-sealing bushing 19 is positioned in the outer end 16 of the tube 11, thereby sealing the outer end 16 of the tube 11. This bushing 19 is preferably formed of silicone material and, more preferably, a room temperature vulcanizable silicone (referred to as "R.T.V."). A needle 8 (having the liquid 7) may be passed through the bushing 19 for the purpose of injecting the liquid 7 into the tube 11. This needle 8 may then be withdrawn from the self-sealing bushing 19, wherein the bushing 19 reseals itself. This precludes the liquid 7 from escaping from the tube 11 through the outer end 16 thereof.

Figure 4:
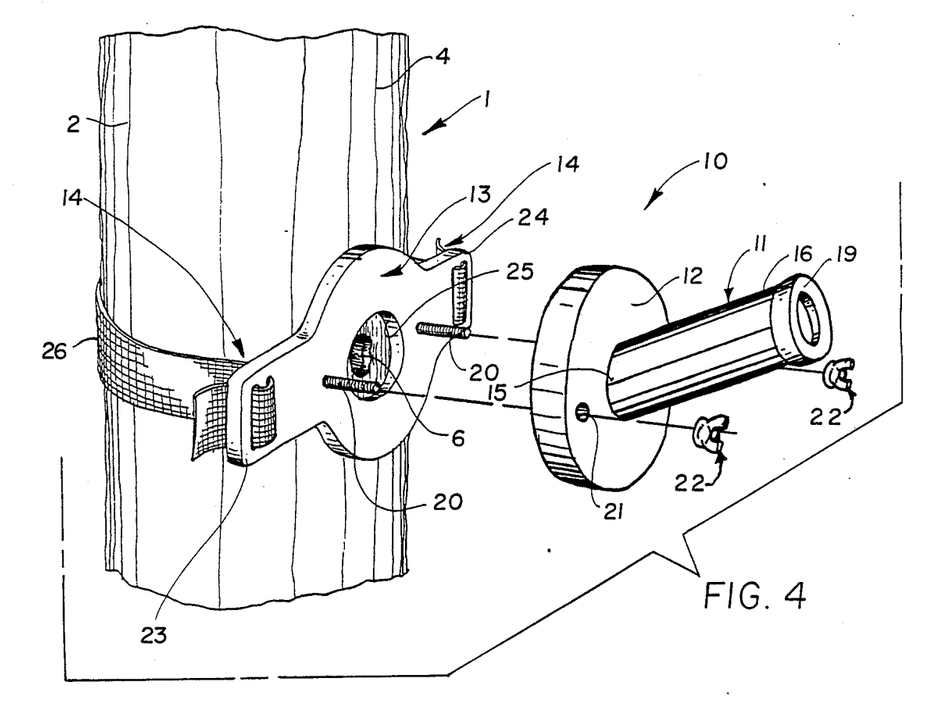
FIG. 4 is an exploded perspective view of the apparatus of the present invention.

A means is provided for removably securing the tube 11 to the bracket 13. This means includes a pair of spaced apart and substantially parallel screws 20 which are carried by the bracket 13. The plate 12 has a pair of apertures 21 formed therein to receive the screws 20. A pair of nuts 22, which preferably are in the form of wingnuts, are removably received on the respective screws 20. As a result, the plate 12 and its tube 11 are removably secured to the bracket 13.

Preferably, the tube 11 and the plate 12 are integrally formed with one another. It is further preferred that the tube 11 and the plate 12 be formed of a suitable plastic material, such as "PVC" (polyvinylchloride).

The bracket 13 has a first end 23 and a second, opposite end 24. The bracket 13 further has an aperture 25 formed therein between the first end 23 and the second end 24.

A nylon webbing 26 is provided having a first end which, when securing the bracket 13 to the trunk 2 of a tree 1, is secured to the first end 23 of the bracket 13. The webbing 26 further has a second end which is secured to the second end 24 of the bracket 13 when securing the bracket 13 to the tree 1. At least one of the first or second ends of the webbing 26 is removably secured to a respective end 23 or 24 of the bracket 13.

When in use, the bracket 13 may be placed against the trunk of the tree 1, such that the aperture 25 in the bracket 13 surrounds the hole 6 formed in the tree 1. The webbing 26 may be extended around the circumference of the tree 1; and both ends of the webbing 26 may be secured to a respective end 23 and 24 of the bracket 13, thereby securing the bracket 13 to the tree 1.

Figure 5:
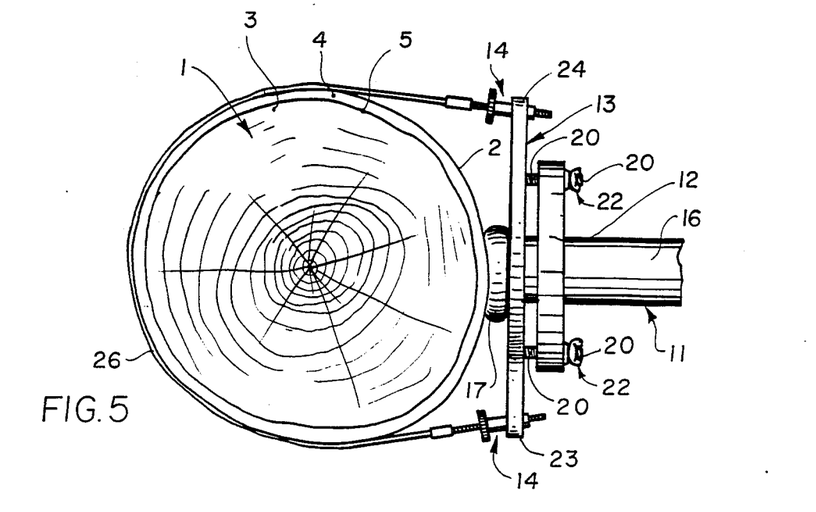
FIG. 5 is a further top plan view of the apparatus, corresponding substantially to that of FIG. 2, but showing one means for varying the length of the webbing.
Figure 6:
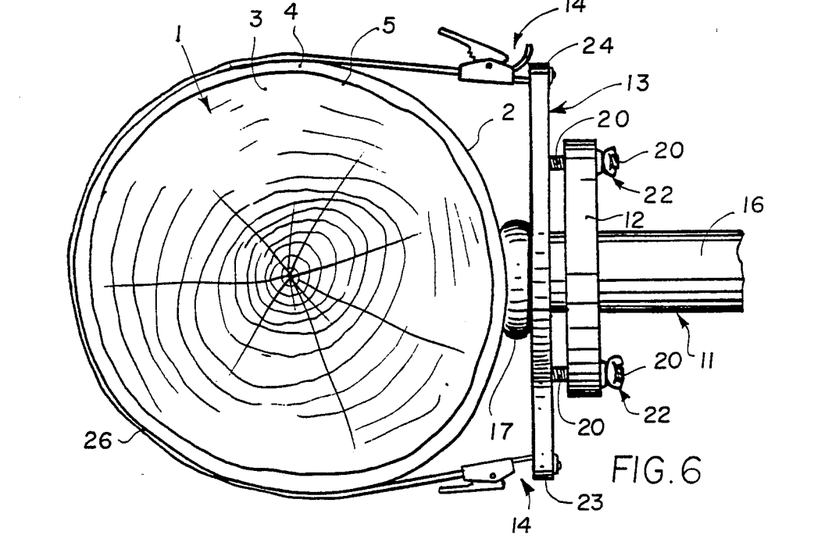
FIG. 6 is a still further top plan view of the apparatus, corresponding substantially to that of FIG. 1, but showing another means for varying the length of the webbing.

Preferably, a means 14 is provided for varying the length of the webbing 26. This ability permits the development of additional tension sufficient to insure the tight securing of the bracket 13 to the tree 1, and such that the resilient bushing 17 (carried by the tube 11) will be pressed against the tree 1. In one embodiment, this means may be a turnbuckle (FIG. 5). In another embodiment, this means may be a cam latch (FIG. 6).

As described above, when the tube 11 is secured to the bracket 13, and the bracket 13 is secured to the tree 1, the resilient bushing 17 is at an oblique angle pressed against the trunk 2 of the tree 1, and the aperture 18 in the resilient bushing 17 is positioned substantially coincident with the hole 6 in the trunk 2. This pressing of the resilient material of the bushing 17 causes an oblique deformation of the bushing 17 against the tree 1, thereby providing a liquid-tight seal therebetween.

Finally, it is preferred that the tube 11 be sized so that the area therein between bushings 17 and 19 can constitute a reservoir 27 for liquid 7 which is injected therein by the needle 8, through the self-sealing bushing 19. It is noted that, as is perhaps best seen in FIG. 3, the tube 11 is positioned at an angle being oblique relative to the trunk of the tree, so as to extend outwardly at an oblique angle relative to the trunk of the tree. In this manner, the liquid 7 is continuously "gravity-fed" to the tree, so that as long as liquid 7 is in the tube 11, this liquid will substantially cover and contact the hole, permitting the tree to continuously feed. The reservoir 27 permits the tree to "feed" as desired.

Figure 7:
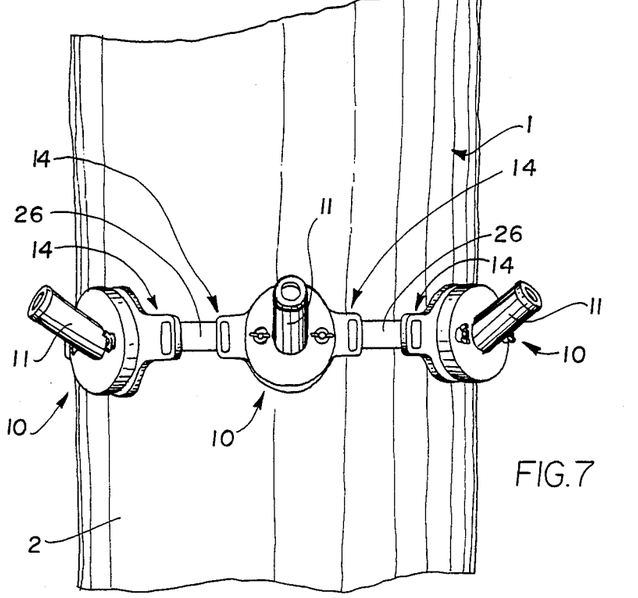
FIG. 7 is a further perspective view, showing a plurality of apparatuses of the present invention being utilized simultaneously.

If desired, in the event that a plurality of holes are formed in the trunk of the tree 1, wherein the diameter of the tree trunk permits, a plurality of upstanding inclined tubes 11, each of which is equipped as described above, are provided (as shown more clearly in FIGS. 3 and 7). Each respective resilient bushing 19 is pressed against the trunk of the tree 1, such that the aperture 18 of each respective bushing 17 is positioned substantially coincident with a respective hole 6, thereby providing for liquid communication between each respective tube 11 and the hole 6. Also, each bushing 19 is deformed against the trunk 2. This deformation provides a respective tight seal therebetween. In this event, each of the brackets 13 is preferably joined by a single webbing 26. The webbing 26 is weaved through apertures formed in the first and second opposite ends, with one end of the webbing 26 being secured to one end of one of the brackets 13, and with the second end of the webbing 26 being secured to a second end of the same bracket 13. In this fashion, different liquids 7 (or the same liquid) may be either simultaneously or sequentially fed to the tree 1 for treating the tree 1.

Having thus described the apparatus 10, the method of the present invention will now be described.

First, a hole 6 (preferably being ⅛ inch in diameter and 1/16 deep) is formed in the trunk 2 of a tree 1, such that the hole 6 extends into and terminates at the cambium layer 5 of the tree 1. Next, a bracket 13 is fastened about the trunk 2 of the tree 1. This bracket 13 is placed against the trunk 2 of the tree 1, such that the aperture 25 of the bracket 13 surrounds the hole 6. The webbing 26 is then extended around (about) the trunk 2 of the tree 1, and both ends of the webbing 26 are secured to the respective ends 23 and 24 of the bracket 13. The length of the webbing 26 is then selectively adjusted to securely hold the bracket 13 against the tree 1.

Next, the upstanding inclined tube 11 (as described above) is provided. The resilient bushing 17 is then pressed against the trunk 2 of the tree 1, such that the aperture 18 formed in the resilient bushing 17 is positioned substantially coincident with the hole 6 formed in the trunk 2 of the tree 1. Positioned thusly, liquid communication is provided between the tube 11 and the hole 6 in the trunk. Moreover, the resilient bushing 17 deforms to provide a substantially liquid-tight seal between the resilient bushing 17 and the trunk 2 of the tree 1.

The inclined tube 11 is then secured to the bracket by disposing the screws 20 in the apertures 21 formed in the circular plate 12, the plate 12 preferably being formed integrally with the tube 11. Nuts 22 are then disposed over each screw 20 and are engaged thereon. The screws 20 are then secured, such that the tube 11 is secured in place.

A hypodermic needle 8 is provided having the liquid 7 therein. The needle 8 is inserted through the self-sealing bushing 19 and into the tube 11. The liquid 7 is then injected from the needle 8, through the tube 11, the aperture 18 formed in the resilient bushing 17, and into the hole 6 in the trunk 2. There the liquid may be absorbed by the tree 1 through the cambium layer 5 therein. Excess liquid may be maintained in the reservoir 27 in the tube 11, so that the tree 1 may be permitted to "feed" as desired. In this manner, the tree is treated.

After injection, the needle 8 is withdrawn from the tube 11, such that the self-sealing bushing 19 reseals itself, substantially precluding the injected liquid 7 from escaping from the tube 11.

If desired, for larger trees, and where the diameter of the tree permits, a plurality of holes 6 may be formed in the trunk 2, each of which extends into the cambium layer 5 of the tree. In such an event, it is preferred that the holes be spaced circumferentially in the trunk 2, each hole preferably being equally spaced from one another. In such a case, a plurality of brackets 13 is secured by preferably a single webbing 26 as described above, and each of brackets 13 is positioned such that the aperture 25 therein surrounds a respective hole 6. A tube 11 is secured to each respective bracket 13 in the manner described above. However, in such an event, it is preferred that each self-sealing bushing 19 is a color which is different from the other self-sealing bushings 19. Liquid is then injected into each tube 11, either at the same time or sequentially. The liquid applied to each tube 11 may be the same liquid or different types of liquid 7, as desired.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A method for treating a tree with a liquid, such that the liquid is continuously gravity-fed to the tree, said tree having a trunk and a cambrium layer, said method, in combination, comprising:

forming a hole in the trunk extending into the cambrium layer thereof;

fastening a bracket about the trunk of the tree;

providing an upstanding inclined tube including an inner open end and an outer end, a resilient bushing positioned in the inner end of the tube and extending therefrom, the bushing having an aperture formed therein of a size being substantially identical to the hole in the trunk of the tree, and a self-sealing bushing positioned in the outer end of the tube, whereby the outer end of the tube is sealed;

pressing the resilient bushing positioned in the tube against the trunk of the tree at an angle oblique relative to the trunk of the tree with the aperture formed in the resilient bushing being positioned substantially coincident with the hole formed in the trunk, such that liquid communication is provided between the tube and the hole in the trunk, and further such that the resilient bushing is obliquely deformed to provide a substantially liquid-tight seal between the resilient bushing and the trunk of the tree;

securing the inclined tube to the bracket on the tree with the tube positioned extending outwardly at an oblique angle relative to the trunk of the tree;

injecting a liquid into the obliquely inclined tube through the sealed end thereof, so that the liquid is continuously gravity-fed to the tree passing from the tube through the aperture formed in the resilient bushing and into the hole in the trunk, wherein the liquid is absorbed by the tree, thereby treating the tree.

2. The method of claim 1, wherein injecting the liquid is further comprised of:

providing a hypodermic needle having liquid therein;
   inserting the needle through the self-sealing bushing and into the tube;
   injecting the liquid from the needle through the tube, the aperture formed in the resilient bushing and into the hole formed in the trunk; and
   withdrawing the needle from the tube, such that the self-sealing bushing reseals itself, substantially precluding the injected liquid from escaping from the tube.

3. The method of claim 1, wherein the step of forming the hole in the trunk is further comprised of forming a hole in the trunk being substantially ⅛ inch in diameter and extending substantially 1/16 inch into the trunk terminating in the cambium layer of the tree.

4. The method of claim 1, wherein the tree has a trunk of relatively small diameter.

5. A method for treating a tree with a liquid, such that the liquid is continuously gravity-fed to the tree, said tree having a trunk and a cambrium layer, said method, in combination, comprising:

forming a plurality of holes in the trunk each extending into the cambrium layer thereof;

fastening a bracket about the trunk of a tree;

providing a plurality of upstanding inclined tubes, each of said tubes including an inner open end and an outer end, a resilient bushing positioned in the inner end of each tube and extending therefrom, each of the bushings having an aperture formed therein having a size which is substantially identical to a respective hole, and a self-sealing bushing positioned in the outer end of the tube, whereby the outer end of each respective tube is sealed;

pressing each respective resilient bushing, positioned in a respective tube, against the trunk of the tree at an angle being oblique relative to the trunk of the tree with the aperture of each respective resilient bushing being positioned substantially coincident with a respective hole formed in the trunk, such that liquid communication is provided between each tube and the hole in the trunk, and further such that the resilient bushing is obliquely deformed to provide a substantially liquid-tight seal between the resilient bushing and the trunk of the tree;

securing each of the inclined tubes to the bracket with the tube positioned extending outwardly at an oblique angle relative to the trunk of the tree and with the aperture of the respective resilient bushings being substantially coincident with one of the respective holes in the trunk, and further being obliquely deformed; and injecting a liquid into at least one of the obliquely inclined tubes through the sealed end thereof, so that the liquid is continuously gravity-fed to the tree passing from the tube through the aperture formed in the resilient bushing and into the hole in the trunk, wherein the liquid is absorbed by the tree, thereby treating the tree.

6. The method of claim 5, further comprised of forming each self-sealing bushing with a color that is different from the other self-sealing bushings.

7. The method of claim 5, wherein the step of forming the plurality of holes in the trunk is comprised of forming a plurality of holes in the trunk, circumferentially about the trunk, each of the holes being formed therein substantially equally spaced from one another.

8. An apparatus for treating a tree with a liquid, such that the liquid is continuously gravity-fed to the tree, said tree having a trunk and a cambrium layer, said trunk further having at least one hole formed therein, extending into the cambrium layer, said apparatus, in combination, comprising:

a bracket means secured to the tree;

an upstanding inclined hollow tube, said hollow tube including an inner end and an outer end;

a resilient bushing positioned in the inner end of the tube and extending therefrom, the resilient bushing having an aperture formed therein of a size being substantially identical to the hole in the trunk of the tree;

a self-sealing bushing positioned in the outer end of the tube, whereby the outer end is sealed, such that a needle may be passed therethrough for the purpose of injecting the liquid into the tube, and further such that the needle may be withdrawn from the self-sealing bushing, wherein the bushing reseals itself precluding liquid from escaping from the tube through the outer end thereof; and means for securing the tube to the bracket means with the tube positioned extending outwardly from the trunk of the tree at an angle being oblique relative thereto, such that the resilient bushing is pressed at an oblique angle against the trunk of the tree, and such that the aperture in the resilient bushing is positioned substantially coincident with the hole in the trunk, thereby providing for liquid communication between the tube and the hole, such that the liquid is gravity-fed to the tree, and wherein the resilient bushing is obliquely deformed against the trunk, whereby a liquid-tight seal is provided therebetween.

9. The apparatus of claim 8, wherein the apparatus is further comprised of the tube being sized constituting a reservoir for liquid injected by the needle through the self-sealing bushing, thereby allowing the tree to feed as desired.

10. The apparatus of claim 8, wherein the means for securing the tube to the bracket is comprised of:

the bracket further having a pair of spaced apart and substantially parallel screws;

a plate carrying the upstanding inclined tube, the tube extending through the plate, and the plate having a pair of apertures formed therein complementary to the screws, so as to receive the screws therein; and a pair of nuts, each of the nuts being received on and engaging a respective screw for removably securing the plate to the bracket.

11. The apparatus of claim 10, wherein the tube and the plate are integrally molded with one another.

12. The apparatus of claim 8, wherein the bracket has a first end and a second opposite end, the bracket further having an aperture formed therein between the first and second opposite ends of the bracket; and means for securing the bracket to the tree.

13. The apparatus of claim 12, wherein the means for securing the bracket to the tree is comprised of:

a nylon webbing having a first end secured to the first end of the bracket body and a second opposite end secured to the second opposite end of the bracket; and wherein at least one of the first or second ends of the webbing is removably secured to a respective end of the bracket, such that the bracket may be placed against the trunk with the aperture formed in the bracket surrounding the hole formed in the trunk of the tree, and further such that the webbing may be extended around the circumference of the trunk of the tree, wherein both ends of the webbing are secured to a respective end of the bracket.

14. The apparatus of claim 13, further comprised of means for varying the length of the webbing permitting the development of sufficient tension for tightly securing the bracket to the tree, such that the resilient bushing is pressed against the trunk.

15. The apparatus of claim 14, wherein the means for varying the length of the webbing is a turnbuckle.

16. The apparatus of claim 14, wherein the means for varying the length of the webbing is a cam latch.

17. The apparatus of claim 8, wherein the self-sealing bushing is formed of silicone material.

18. The apparatus of claim 17, wherein the silicone is room temperature vulcanizable silicone.

19. The apparatus of claim 8, wherein the trunk of the tree has a plurality of holes formed therein, each of the holes extending into the cambium layer, said apparatus comprising:

a plurality of upstanding inclined hollow tubes, each of the tubes having a respective inner end and an outer end;

a resilient bushing positioned in each respective inner end of each tube and extending therefrom, each of the bushings having a respective aperture formed therein, each of the apertures being of a size that is substantially identical with a respective hole;

a self-sealing bushing positioned in each respective outer end of each tube, whereby each outer end is sealed, such that a needle may be passed therethrough for the purpose of injecting the liquid into each respective tube, and further such that the needle may be withdrawn from each self-sealing bushing, wherein the bushing reseals itself precluding liquid from escaping from the tube through the respective outer ends; and means for securing each respective tube having the respective resilient bushings and the self-sealing bushings positioned therein to the bracket, such that each resilient bushing is pressed against the trunk of the tree having the aperture of each respective resilient bushing positioned substantially coincident with a respective hole in the trunk and providing for liquid communication between each respective tube and the hole, and deforming each resilient bushing against the trunk, whereby a respective tight seal is provided therebetween.

20. An apparatus for treating a tree with a liquid, such that the liquid is continuously gravity-fed to the tree, said tree having a trunk and a cambrium layer, said trunk further having a plurality of holes formed therein, extending into the cambrium layer, said apparatus, in combination, comprising:

a plurality of brackets, each of said brackets being secured to the tree;

a plurality of upstanding inclined hollow tubes, each of said hollow tubes including a respective inner end and a respective outer end;

a resilient bushing positioned in each of the respective inner ends extending therefrom, each resilient bushing having an aperture formed therein of a size being substantially identical to the holes;

a self-sealing bushing positioned in the outer end of each respective tube, whereby the outer end is sealed, such that a needle may be passed therethrough for the purpose of injecting the liquid into each respective tube, and further such that the needle may be withdrawn from the self-sealing bushings, wherein each bushing reseals itself precluding liquid from escaping from the tubes through the outer ends thereof;

means for securing each of the tubes, having the resilient bushings and the self-sealing bushings positioned therein, to a respective bracket with the tubes positioned extending outwardly from the trunk of the tree at an angle being oblique relative thereto, such that each resilient bushing is pressed at an oblique angle against the trunk of the tree, having the aperture thereof positioned substantially coincident with a respective hole in the trunk and providing for liquid communication between one of the tubes and one of the holes, such that the liquid is gravity-fed to the tree, and obliquely deforming each resilient bushing against the trunk, whereby a liquid-tight seal is provided therebetween; and wherein the means for securing each tube to the respective bracket includes:

the bracket further having a pair of spaced apart and substantially parallel screws;

a plate carrying one of the upstanding inclined tubes, the tube extending through the plate, the plate having a pair of aperture formed therein complementary to the screws, so as to receive the screws therein;

wherein each self-sealing bushing is formed of a room temperature vulcanizable silicone material.

21. An apparatus for treating a tree with a liquid, such that the liquid is continuously gravity-fed to the tree, said tree having a trunk and a cambrium layer, said trunk further having at least one hole formed therein, extending into the cambrium layer, said apparatus, in combination, comprising:

a bracket secured to the tree;

an upstanding inclined hollow tube, the hollow tube including an inner end and an outer end;

a resilient bushing positioned in the inner end of the tube and extending therefrom, the resilient bushing having an aperture formed therein of a size being substantially identical to the hole;

a self-sealing bushing positioned in the outer end of the tube, whereby the outer end is sealed, such that a needle may be passed therethrough for the purpose of injecting the liquid into the tube, and further such that the needle may be withdrawn from the self-sealing bushing, wherein the bushing reseals itself precluding liquid from escaping from the tube through the outer end thereof;

means for securing the tube, having the resilient bushing and the self-sealing bushings positioned therein, to the bracket with the tube positioned extending outwardly from the trunk of the tree at an angle being oblique relative thereto, such that the resilient bushing is pressed at an oblique angle against the trunk of the tree having the aperture in the resilient bushing positioned substantially coincident with the hole in the trunk and providing for liquid communication between the tube and the hole, such that the liquid is gravity-fed to the tree, and obliquely deforming the resilient bushing against the trunk, whereby a liquid-tight seal is provided therebetween;

the tube being sized to constitute a reservoir for liquid injected by the needle through the self-sealing bushing, thereby allowing the tree to feed as desired;

wherein the means for securing the tube to the bracket includes a bracket further having a pair of spaced apart and substantially parallel screws;

a plate integrally molded with the tube and carrying the upstanding inclined tube, the tube extending through the plate, the plate having a pair of apertures formed therein complementary to the screws, so as to receive the screws therein;

a pair of nuts, each of said nuts being received on and engaging a respective screw for removably securing the plate having the tube carried therein to the bracket;

wherein the bracket includes a first end and a second opposite end, the bracket further having an aperture formed therein between the first and second opposite ends;

means for securing the bracket to the tree including:

a nylon webbing having a first end secured to the first end of the bracket and a second opposite end secured to the second opposite end of the bracket;

at least one of the first or second ends of the webbing being removably secured to a respective end of the bracket, such that the bracket may be placed against the trunk having the aperture formed in the bracket surrounding the hole formed in the trunk of the tree, and further such that the webbing may be extended around the circumference of the trunk of the tree and having both ends thereof secured to a respective end of the bracket; and means for varying the length of the webbing permitting the development of sufficient tension for tightly securing the bracket to the tree, such that the resilient bushing is pressed against the trunk.

* * * * *